(12) United States Patent
Bagnall et al.

(10) Patent No.: US 6,447,255 B1
(45) Date of Patent: Sep. 10, 2002

(54) GAS TURBINE NOSE CONE ASSEMBLY

(75) Inventors: Adam M Bagnall, Derby; Kevin P Vyze, Burton on Trent, both of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/459,851

(22) Filed: Dec. 14, 1999

(30) Foreign Application Priority Data

Dec. 29, 1998 (GB) .............................................. 9828812

(51) Int. Cl.$^7$ .......................... F01D 25/00; B64C 11/14
(52) U.S. Cl. ............................... 416/245 R; 415/218.1; 277/626; 277/644; 277/647
(58) Field of Search ...................... 416/245 R, 245 A, 416/93 R, 93 A, 94; 415/218.1, 219.1; 277/626, 644, 647

(56) References Cited

U.S. PATENT DOCUMENTS

| | | | | |
|---|---|---|---|---|
| 3,758,123 A | * | 9/1973 | Ksieski | ........................ 277/206 |
| 3,799,693 A | * | 3/1974 | Hull | ........................ 415/218.1 |
| 3,834,157 A | * | 9/1974 | Hoffmann | ................ 416/245 A |
| 3,990,814 A | * | 11/1976 | Leone | ..................... 416/245 R |
| 4,393,650 A | * | 7/1983 | Pool | ........................ 416/245 R |
| 4,863,354 A | | 9/1989 | Asselin | |
| 5,354,072 A | * | 10/1994 | Nicholson | ................ 277/206 R |
| 5,573,378 A | | 11/1996 | Barcza | |
| 5,669,612 A | * | 9/1997 | Nicholson | ................ 277/167.5 |

FOREIGN PATENT DOCUMENTS

| | | |
|---|---|---|
| EP | 0166573 | 1/1986 |
| EP | 0294654 | 11/1991 |
| EP | 0850831 | 7/1998 |
| GB | 1548936 | 7/1979 |
| GB | 1557856 | 12/1979 |
| GB | 2038958 | 7/1980 |

* cited by examiner

*Primary Examiner*—Christopher Verdier
(74) *Attorney, Agent, or Firm*—W. Warren Taltavull; Manelli, Denison & Selter PLLC

(57) ABSTRACT

A nose cone assembly (30) for a gas turbine engine (10) comprising a spinner (34) having a generally conical forward portion (33) and a base portion (35). The base portion (35) of the spinner (34) is disposed radially inside an extended profile of the forward portion (33). Upon the base (35) there is a radially outwardly extending flange (41) through which mounting fasteners (40) are arranged to attach the spinner (34) to a fan hub (6) of the gas turbine engine (10). A fairing (36) is arranged to surround and cover the base portion (35) of the spinner (34) when the nose cone assembly (30) is fitted to the fan hub (6). The fairing (36) having a generally circumferentially and axially smooth continuous outer surface, the profile of which continues that of the forward portion 33 of the spinner 34. Fasteners (44) preferably extend from the fairing (36) in a substantially radially inwardly directed direction to attach the fairing (36). At least three mounting brackets (42) are disposed radially inside the fairing (36) to attach the fairing (36).

21 Claims, 5 Drawing Sheets

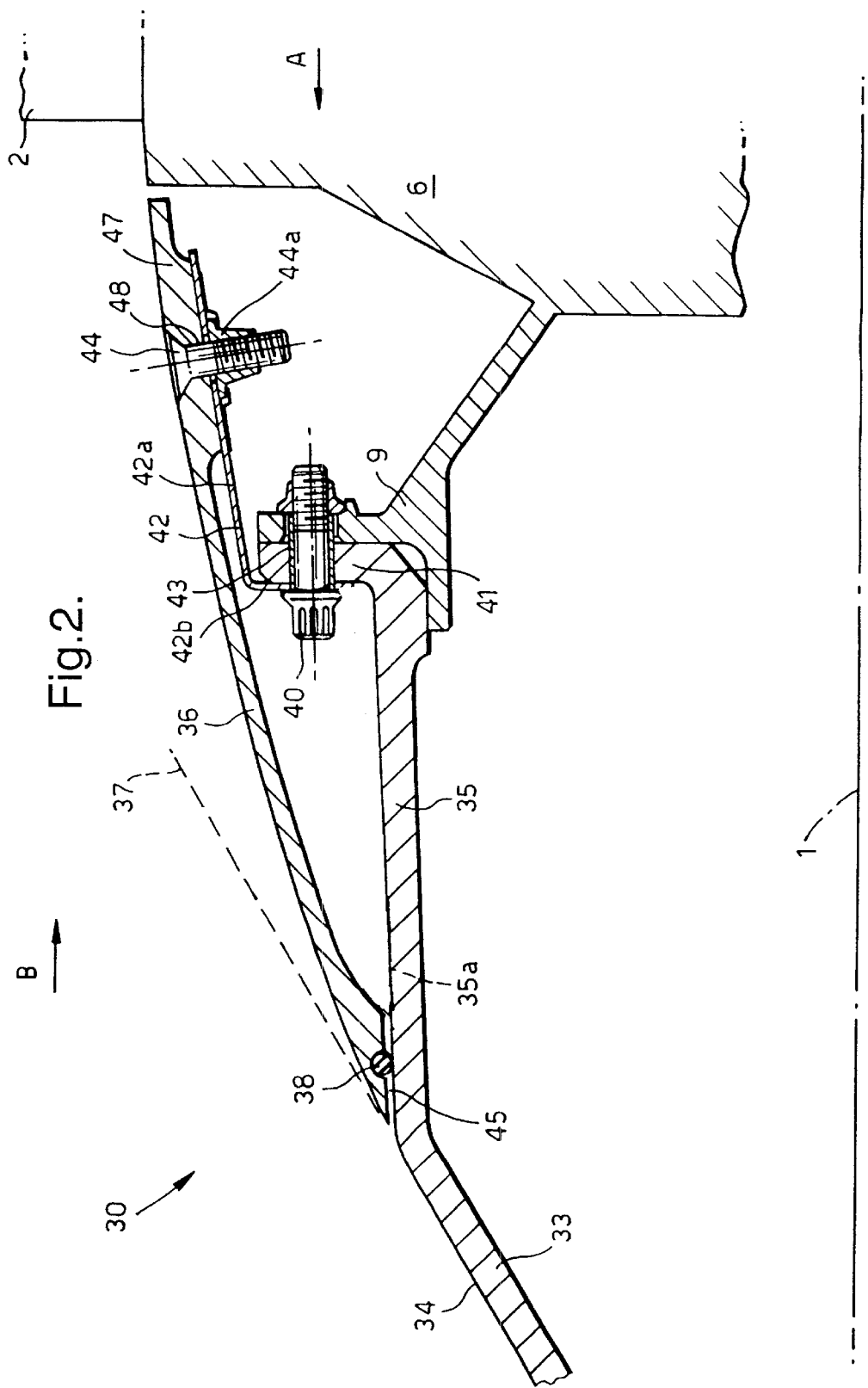

GAS TURBINE NOSE CONE ASSEMBLY

FIELD OF THE INVENTION

The present invention relates to gas turbine engines and in particular to nose cones found on the fan inlet hubs of such engines.

A removable nose cone, sometimes called a spinner is attached to, and rotates with a hub in the centre of the inlet of a gas turbine engine. This nose cone provides an aerodynamic surface covering the hub hardware and directs the inlet airflow smoothly into the hub region of the gas turbine engine fan.

BACKGROUND OF THE INVENTION

Conventionally the nose cone is attached to the fan hub by a number of circumferentially spaced, axially extending bolts disposed around the base portion of the cone and engaging the fan hub assembly. To provide access to these bolts, for fitting or removing the nose cone, elliptical holes are provided in the nose cone. Alternatively pockets or indentations below the nominal surface of the cone are formed in the nose cone base region. The bolts are fitted within these pockets which are large enough to accommodate the heads of the bolts.

A problem with both of these arrangements is that the airflow into the fan, over the nose cone, is disturbed, in particular in the region surrounding the fan hub at the root portion of the fan blades. In the first arrangement some air flows into the elliptical holes and also the sharp edges of the hole affect and disturb the remainder of the flow of air passing over them. In the second arrangement there are more rounded edges to the pockets than are found with the holes reducing the effect they have on the airflow passing over them. However the pockets are larger than the holes and so they will effect and disturb the flow over a larger area of the nose cone. The airflow will also flow into these pockets producing eddy flows which will again effect the airflow over the nose cone. Engine testing and analysis have shown that disturbances to the airflow over the nose cone reduces the efficiency of the root portions of the fan downstream of the nose cone. This in turn has a significant effect on the overall engine performance.

Additionally the fabrication of a nose cone incorporating pockets is complex and therefore expensive. The pockets within the nose cone, and to a certain extent the holes, increase the stresses within the nose cone requiring that the nose cone has to be made from thicker material. This undesirably increases the weight of the nose cone.

SUMMARY OF THE INVENTION

It is therefore desirable to provide an improved nose cone assembly that addresses the above problems, provides an improved less disturbed airflow into the fan and/or offers improvements generally.

According to the present invention there is provided a nose cone assembly for a gas turbine engine comprising a spinner having a generally conical forward portion and a base portion, a flange is upon the base of the base portion of the spinner, mounting fasteners through the flange attach the spinner to a fan hub of the gas turbine engine; wherein there is an extended profile of the forward portion of the spinner, the base portion of the spinner is disposed radially inside an extended profile of the forward portion of the spinner and the flange extends radially outwards from the base portion of spinner; a fairing is arranged to surround and cover the base portion of the spinner when the nose core assembly is fitted to the fan hub, the fairing when assembled having a generally circumferentially and axially smooth continuous outer surface profile of which continues that of the forward portion of the spinner.

Preferably the fairing is frusto-conical.

By virtue of its frusto-conical shape the fairing is self supporting allowing for a simple attachment means to be used to attach the fairing to the spinner and fan hub.

The nose cone assembly may have an axially curved outer profile.

Preferably an upstream end of the fairing is arranged to abut and be supported from the spinner.

Preferably the spinner is provided with a location feature which axially engages an upstream portion of the fairing.

A seal may be provided at the upstream end of the fairing between the upstream end of the fairing and the spinner. The seal may comprise an annular 'O' ring. Preferably the annular 'O' ring seal is set within a recess within an abutting surface of the upstream end of the fairing. The seal may comprise an annular ring which has an omega cross section and which is mounted on the spinner.

Preferably the fasteners extend from the fairing in a substantially radially inwardly directed direction to attach the fairing to the spinner and fan hub. Furthermore the fasteners may extend in a direction generally perpendicular to an outer surface of the fairing in the region of the fasteners. The fasteners are preferably flush with an outer surface of the fairing and may comprise counter sunk screws.

At least three mounting brackets are preferably disposed radially inside the fairing attach the fairing to the spinner and fan hub. The brackets are flexible in a radial direction.

The radial flexibility of the brackets which attach the fairings to the spinner and fan hub allows for and accommodates dimensional mismatches between the fairing, spinner and fan hub.

Preferably the brackets axially locate the fairing.

The brackets may be generally L shaped. They may also be attached using the same mounting fasteners which are used to attach the spinner to the fan hub.

A further flange may extend from the bracket and is arranged to engage the fairing to provide axial retention of the fairing.

Preferably anti-rotation features are provided to prevent rotation of the brackets. Such features may comprise dowels which engage the brackets.

BRIEF DESCRIPTION OF THE DRAWINGS

The present invention will now be described by way of example only with reference to the following figures in which:

FIG. 2 shows a more detailed exaggerated sectional view of the nose cone assembly shown in FIG. 1;

DETAILED DESCRIPTION OF THE INVENTION

Figure 1:
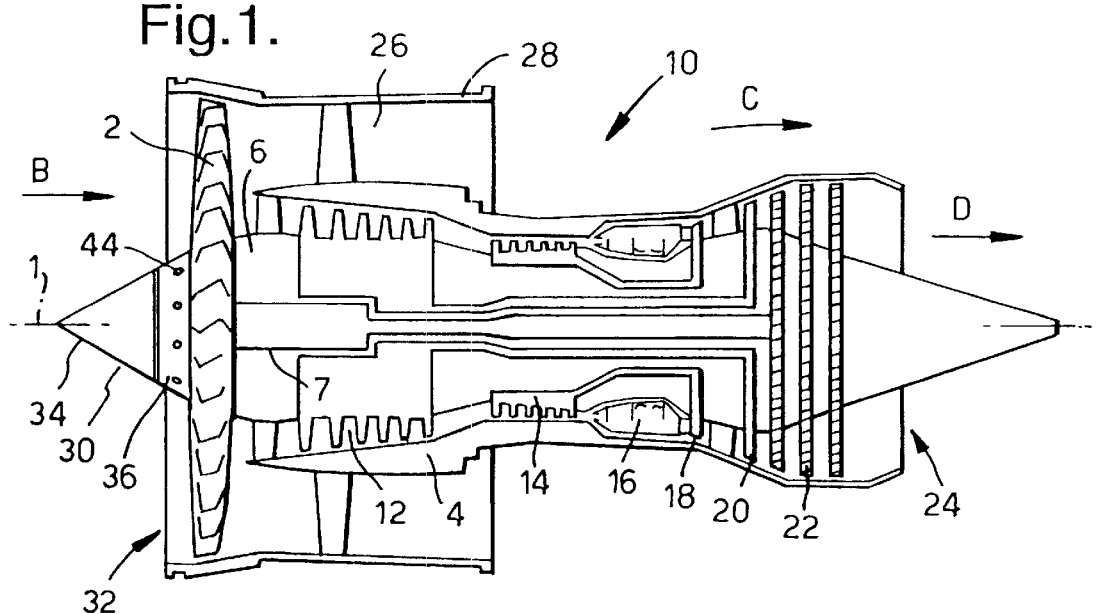
FIG. 1 shows a sectional view of a gas turbine engine incorporating a nose cone assembly according to the present invention.

Referring to FIG. 1, a turbofan gas turbine engine 10 comprises in flow series an inlet 32, a fan 2 and a core engine 4 comprising an intermediate pressure compressor 12, high pressure compressor 14, a combustor 16, high pressure turbine 18, intermediate pressure turbine 20, low pressure turbine 22 and an exhaust 24. The fan 2, compressors 12,14, and turbines 18,20,22 all arranged to rotate about a central common engine axis 1. Air is drawn into the engine 10, as shown by arrow B, through the annular inlet 32 and into the fan 2. The fan 2 compresses the air and a portion flows, in a downstream direction, into the core engine 4 where it is further compressed, mixed with fuel and burnt in the combustor 16. Throughout this specification the terms; 'downstream' and 'upstream' are used with respect to the general direction of gas flow through the engine 10. The high pressure high energy gas stream exiting the combustor 16 then flows through the turbines 18,20,22, which extract energy from, and are rotated by, the gas stream so driving the compressors 12,14 and fan 2 via shafts drivingly interconnecting them. The gas stream then exits the turbines through the exhaust and provides a proportion of the propulsive thrust of engine 10. A second portion of the air compressed by the fan 2 flows around the core engine 4 within a fan duct 26 defined by the outside of the core engine 4 and the engine casing 28. This flow of compressed air then exits the engine 10 as shown by arrow C providing a further proportion of the engine thrust. As such the gas turbine engine is of a conventional design and operation.

The fan 2 comprises a number of fan blades which are mounted upon a central fan hub 6 or disc. The fan hub 6, or fan annulus filler fairings (not shown) attached thereto define an inner aerodynamic surface of the fan. The fan hub 6 is attached to a fan shaft 7 which in turn drivingly connects the fan 2 to the low pressure turbine 22.

To provide a smooth flow of air through the inlet 32, and into the fan 2, a nose cone assembly 30 is attached to the fan hub 6. The nose cone assembly 30 has a generally conical shape with the axis of the cone, aligned with the engine axis 1, and extending in a downstream axial direction from a point vertex at an upstream end to a generally circular base adjacent the fan hub 6. The diameter of the circular base of the nose cone assembly 30 is substantially the same as that of outer surface of the fan hub 6, or fan annulus filler fairing on the fan hub. The outer profile at the base of the nose cone assembly 30 is axially aligned with the outer profile of the fan hub 6 or fan annulus filler fairing defining the inner aerodynamic surface of the fan 2 at the innermost extent of the fan blade aerofoil.

The nose cone assembly 30 comprises a spinner 34 and a fairing 36. As shown in FIG. 2 the spinner 34 is generally conical. Towards the base of the spinner 34 though the cone angle (the angle of the outer surface from the central cone axis which in this case is aligned with the engine axis 1) is varied such that the base portion 35 of the spinner 34 is developed into a generally cylindrical shape with an outer profile substantially parallel to the engine axis 1. The base portion 35 of the spinner is disposed lying radially inside of an imaginary extended profile, shown by phantom line 37, of a forward portion 33 of the spinner 34.

At the base of the spinner 34 as a whole, there is a flange 41 which extends radially outwards from the cylindrical base portion 35 and is substantially perpendicular to the base portion 35 of the spinner 34 and the engine axis 1.

It being appreciated that the base portion 35 of the spinner need not necessarily be parallel to the engine axis 1. In other embodiments the profile of the base portion could be at an angle to the engine axis 1, whilst still being disposed radially inside of an extended profile of the forward portion 33 of the spinner 34. Similarly the flange 41 need not necessarily be perpendicular to the base portion or engine axis. However to provide ease of assembly and manufacture it is advantageous to have the flange perpendicular to the engine axis 1.

The flange 41 has a number axially extending holes 43 circumferentially spaced around the flange 41. The spinner 34 is fitted to the engine 10 using axially extending bolts 40 which pass through these holes 43 to attach and mount the spinner 34 to a co-operating fan hub flange 9 attached to, or integral with, the fan hub 6.

As shown in this embodiment the fan hub flange 9 may also have an axially extending extension on the radially inner end of the flange 9. A radially inner surface of the spinner 34 is arranged to rest upon this extension when the spinner 34 is fitted to the fan hub 6 thereby radially locating the spinner 34 on the fan hub 6.

The fairing 36 is of a generally frusto-conical self supporting shape and has a continuous, smooth, radially outer surface. The fairing 36 is fitted, as part of the nose cone assembly 30, to the engine 10 concentrically with the spinner 34 and engine axis 1. When fitted the fairing 36 is disposed radially outside of, and surrounds and covers, the base portion 35 and flange 41 of the spinner 34. The outer surface 35 of the fairing 36 smoothly continues the profile of the front portion 33 of the spinner 34 towards, at its rear downstream end, the inner aerodynamic surface of the fan 2 defined by the radially outer surface of the fan hub 6 adjacent the roots of the fan blades 2. The fairing provides a smooth aerodynamic air washed surface for air flowing into the engine inlet 32 into the fan 2 of the engine 10.

The front end of the fairing 36 is dimensioned such that it abuts against the base portion 35 of the spinner 34 where the base portion 35 and forward portion of the spinner 34 meet. This front end of the fairing 36 is also thickened such that there is defined a radially inner face 45 at the front of the fairing 36 which matches and abuts against the spinner 34. This provides a degree of radial location of the front of the fairing 36 with the spinner 34.

A resilient 'O' ring 38 may also be set into an annular groove in this inner face abutting the spinner 34 at the front end of the fairing 36. The 'O' ring 38 provides a seal between the fairing 36 and the spinner 34. This seal preventing airflow underneath the fairing, between the fairing 36 and spinner 34 which may tend to lift the fairing 36 and cause the fairing 36 to vibrate. The 'O' ring 38 also prevents the ingress of dirt and water. Such ingress of dirt and water potentially promoting ice build up leading to imbalance in the nose cone assembly 30. In addition the resilience of the 'O' ring will centralise the fairing 36 relative to the spinner 34 and engine axis 1, allow for small radial tolerances and mismatches between the fairing 36 and the spinner 34, and provide some vibration damping.

Alternatively a seal of an 'Omega' cross section can be provided on, and bonded to, the base portion 34 of the spinner 34 where the front end of the faring 36 abuts the spinner 34. This 'Omega' seal abutting and contacting the underside of the front end of the fairing 36 with no thickening of the front end of the fairing 36 being required. The seal could also be attached to the fairing 36 itself.

Figure 5:
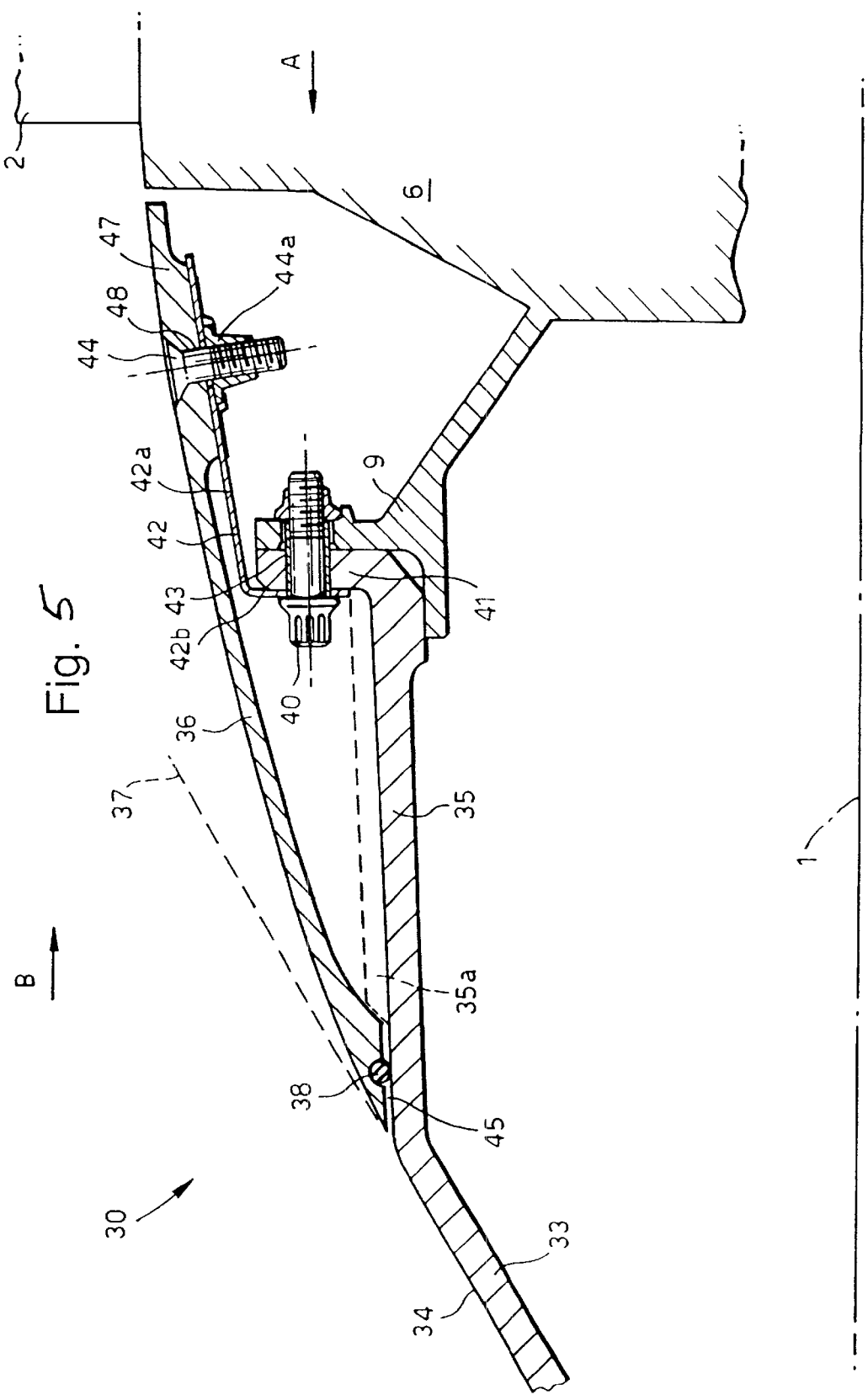
FIG. 5 is a view similar to FIG. 2 but showing alternate embodiment.
Figure 6:
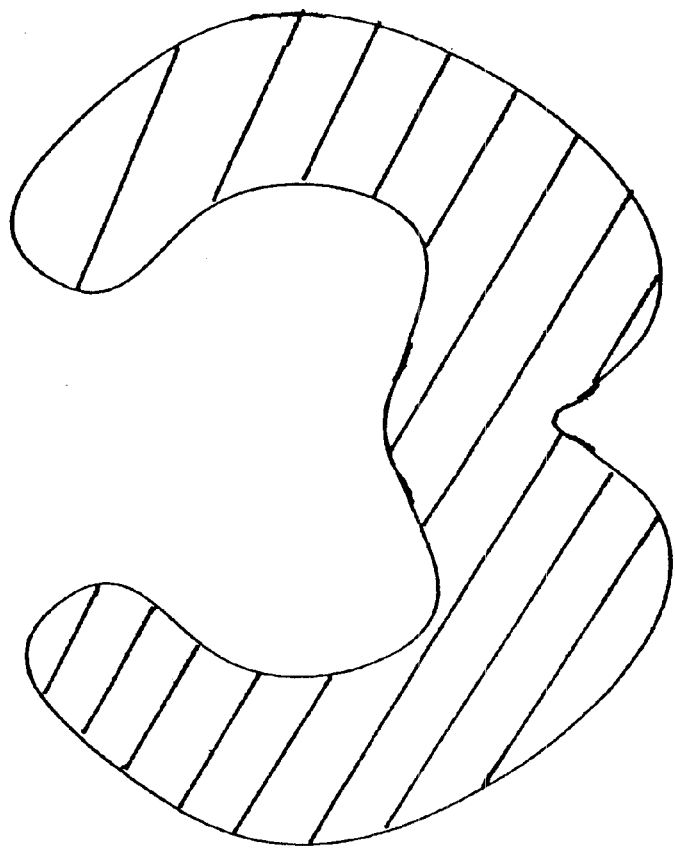
FIG. 6 is a sectional view of an Omega seal used with this invention.

In an alternative embodiments a step, groove or recess may be provided in the outer surface of the base portion 35 of the spinner 34 as shown by phantom lines 35a in FIG. 5. The front fairing 36 is arranged to also abut axially against this step thereby proving a degree of axial location for the fairing 36, in particular during assembly, restricting it from moving downstream, axially rearward.

Figure 3:
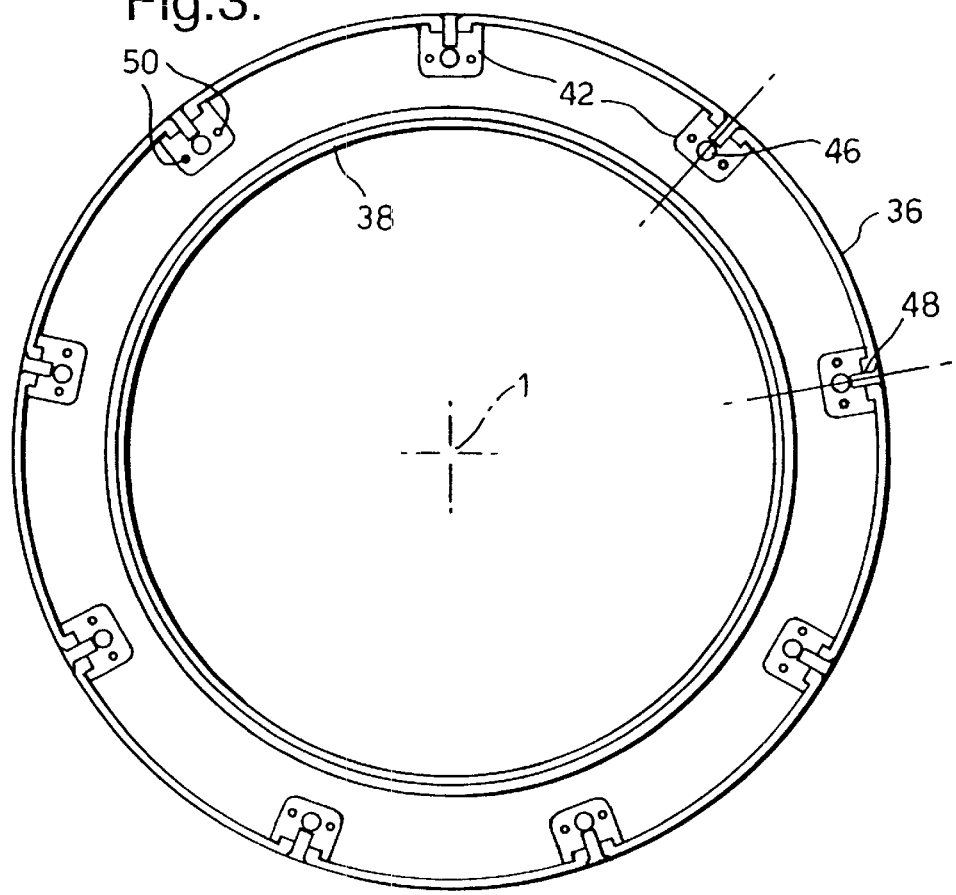
FIG. 3 shows an axial view in the direction of arrow A of the fairing of the nose cone assembly shown in FIG. 1.

The rear end of the fairing 36 is located and mounted via nine flexible spring metal finger members, or brackets, 42 equi-spaced around the circumference of the fairing 36, spinner flange 41, and engine axis 1 as shown in FIG. 3. Each of the fingers 42 are fabricated from a strip of spring sheet metal one end of which is bent with respect to the remainder such that the fingers have an 'L' shape. As such the fingers 42 have a relatively simple shape and are easy and cheap to manufacture. A flange portion 42b of each finger 42 extends from an end of the main portion 42a and at an angle thereto, as shown in FIG. 2. The flange portion 42b of the fingers 42 is attached to the spinner 34, and to the fan hub 6 when assembled, using the axial spinner mounting bolts 40 which pass through holes 46 provided in the flange portion 42b of the fingers 42. In other embodiments the flange portion 42b of the fingers 42 could be independently mounted to the spinner flange 41 using additional bolts rather than the spinner bolts 40. The fingers 42 could also be integral with the spinner flange 41 or welded thereto.

As shown the fingers 42 are arranged such that the main portion 42a of each of the fingers 42 is disposed radially outside of the flange portion 42b and extends in a generally axial direction parallel to, and abutting, the rear of the fairing 36. Countersunk screws 44 which pass through small holes 48 perpendicular to the outer surface of the fairing 36 connect the rear of the fairing 36 to the fingers 42. Specifically the screws 44 engage captive nuts 44a which are provided in the ends of the main portion 42a of the fingers 42. To allow for this mounting the rear of the fairing 36 is thickened in the discrete regions of the countersunk screw holes 48. This strengthens this region of the fairing 36 and allows for the heads of the screws 44 to be sufficiently countersunk into the fairing 36 surface such that, when fitted, the heads of the screws 44 are flush with the outer surface of the fairing 36.

The shape and dimensions of the fingers 42 are such that, when fitted, they are rigid in generally axial and circumferential directions, but are flexible in a radial direction. The fingers 42 thereby provide axial location of the fairing 36 and sufficient circumferential location to rotate the fairing 36 with the fan 2 and spinner 34. The radial flexibility of the of rear mounting providing radial location whilst allowing for dimensional mismatches between the fairing 36 and the spinner 34 due to manufacturing and assembly tolerances and differential radial growth. Without this radial flexibility the rear mounting would resist the radial dimensional mismatches resulting in large stress, particularly the screws 44 and fingers 42, and/or distortions in the fairing 36. Both of which could possibly result in premature failure of the fairing 36 and/or mounting arrangement. Distortions to the fairing 36, and so distortions to the outer air washed surface of the faring 36 will also effect the aerodynamic performance of the faring 36 and the airflow into the engine.

The fingers 42, when attached to the fairing 36 using the countersunk screws provide the main axial location of the fairing 36 and axially fix the downstream end of the fairing 36 to the spinner 34. In embodiments where a groove or recess is provided in the base portion 35 of the spinner 34 to provide some axial location the fingers 42 and the groove are dimensioned such that axial fight between the mountings is minimised. As such when the nose cone assembly 30 is assembled a clearance may be provided between the fairing 36 and any groove or recess in the base portion 35. This allows the front of the faring to move slightly axially relative to the spinner 34, accommodating any slight axial growth of the fairing and spinner 34.

Figure 4:
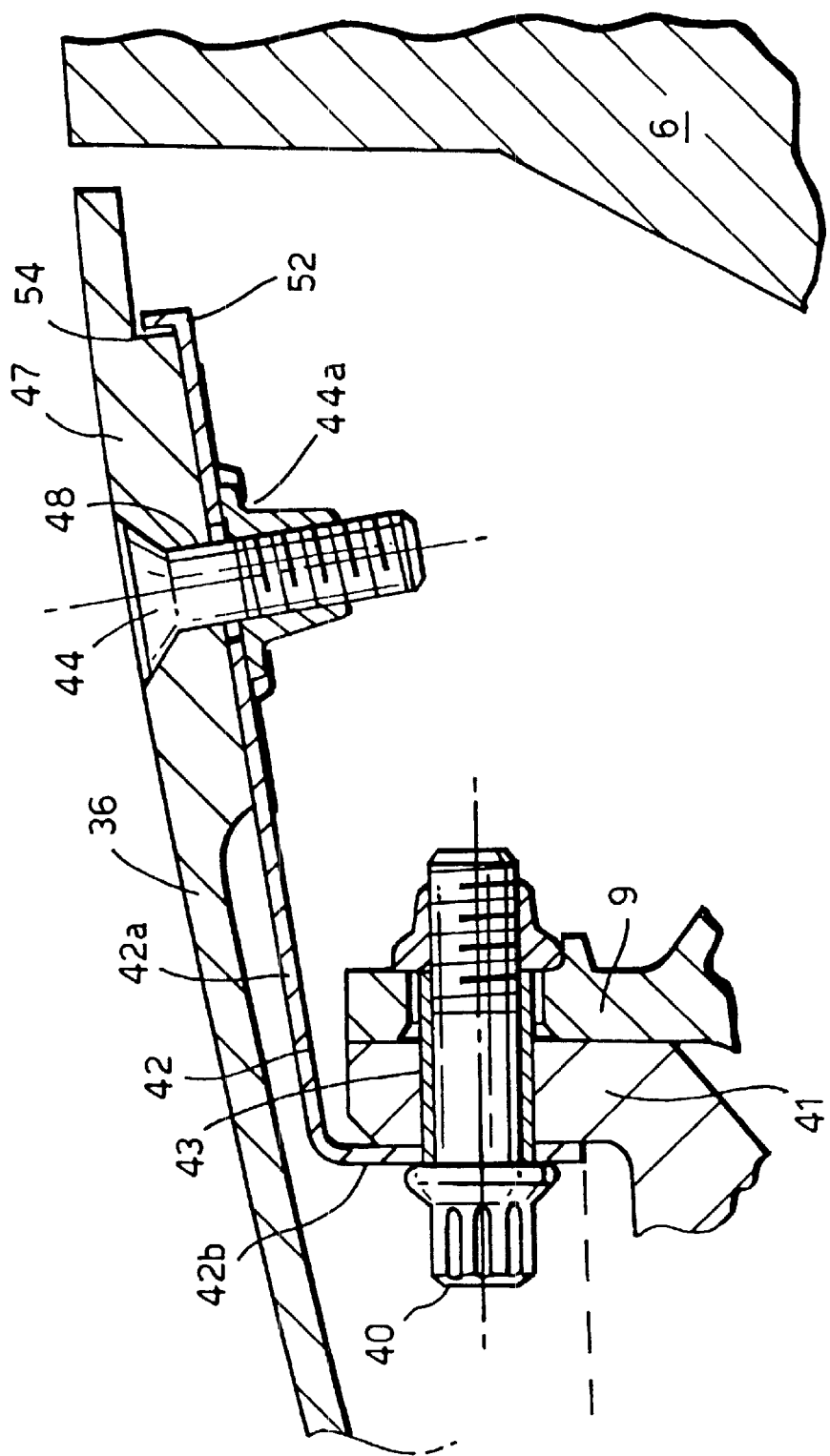
FIG. 4 shows a more detailed sectional view of fairing mounting arrangement of a further embodiment of the mounting arrangement shown in FIG. 2.

In further embodiments a further flange or lip 52 may be provided on the downstream end of the main portion 42a of the fingers 42 to provide further axial location of the fairing 36. This is shown in FIG. 4 in which like reference numerals have been used for like features shown in the other figures. This lip 52 extends generally radially from the main portion 42a of the finger 42 and is substantially normal to the surface of the fairing 36. The lip 52 engages a shoulder 54 on the underside of the downstream end of the fairing 36 thereby preventing the fairing 36 from moving axially downstream relative to the spinner 34. In alternative arrangements the lip 52 may be arranged to engage the downstream end of the fairing 36 itself.

The lip 52 and/or groove 35a in the base portion 35 of the spinner 34 are particularly useful during assembly of nose cone assembly 30 since they provide a degree of axial location of the fairing 36 allowing easier alignment of the countersunk screw holes 48 with the fingers 42.

Dowels 50 extend axially through holes in the flange portion 42b of the fingers 42 on either side of the axial spinner mounting bolts 40 and are engaged within recesses within the spinner flange 41. These dowels 50 prevent rotation of fingers 42 about the axial spinner mounting bolts 40. Such rotation, when assembled, could cause stresses and distortions within the fingers 42, the mountings of the fairing 36, and in the fairing 36 itself. As shown in FIG. 3 two such dowels 50 are used for each finger 42. It will be appreciated though that a single dowel could be used in alternative embodiments. The dowels 50 could also be integral with, or welded to, the flange 41 or the flange portion 42b of the finger 42. Additionally other arrangements could be used to prevent rotation of the fingers 42. For example anti-rotation tabs could be provided upon the fingers 42 or the flange 41, the flange portion 42b of the fingers 42 could be engaged within a recess within the spinner flange 41, or two mounting bolts could be used to attach the fingers 42 to the flange 41. All of the fingers 42 could also be attached to a continuous annular ring surrounding the flange 41 and underneath all of the mounting bolts 40 around the circumference of the flange 41.

In conventional nose cone assembly or spinner mounting arrangements the mounting bolts, similar to the axially extending bolts 40, are provided with washers between the head or nut of the bolt and the flange. With the present: arrangement the flange portion 42b of the fingers 42 is arranged and trapped between the bolt 40 and the spinner flange 41. The flange portion 42b of the fingers 42 can therefore provide the same function as the washer at one end of the bolt 40, and so the washer at that end can be dispensed with. The washer at that end being, in effect, integral with the flange portion 42b of the finger 42.

Although in this embodiment there are nine flexible fingers 42 it will be appreciated that a minimum of only three fingers 42 spaced around the circumference are required to provide adequate securing of the rear of the fairing 36. The nine fingers 42 providing a degree of redundancy in the mounting shown in this embodiment.

By virtue of its continuous frusto-conical shape the fairing 36 is self supporting. This means that no distorting loads need to be transmitted at its mounting points in order to maintain its shape. This allows the use of the mounting arrangements described above with the rear of the fairing 36 being held, in part, radially outwards by the structural strength of fairing 36 itself.

The nose cone assembly 30, incorporating a spinner 34 and fairing 36, and the mounting arrangement provides a smooth continuous aerodynamic surface at the inlet to the fan 2 whilst still allowing access to the main spinner mountings 40 to allow for assembly and removal of the nose cone assembly 30 from the engine 10. This smooth aerodynamic surface is generally continuous around the circumference and over substantially the whole of the outer surface of the nose cone assembly 30. This reduces the disturbance of, and improves, the flow of air into the fan 2 and the engine 10 which in turn improves the engine performance. In particular there are no openings or indentations with a significant axial component within the outer surface of the fairing 36 or nose cone assembly 30 as a whole. Such openings or indentations which have a significant axial component, and which are found in conventional arrangements, having been found to undesirably disturb to the airflow over the nose cone assembly 34. In contrast substantially radial openings which are normal to the outer surface disturb the airflow less especially when plugged, for example by countersunk screws 44.

The spinner 34 is conventionally made from a composite material in order to reduce the weight of the structure. It is also known though to fabricate the spinner from a light weight metal, for example titanium. The fairing 36 is conventionally made from titanium, although it can also be made from a composite material. If both the spinner 34 and the fairing 36 are made from the same material then their thermal and centrifugal expansion rates will be comparable reducing the chances of clearances opening up where they join, or of stresses being introduced due to differential expansion of the spinner 34 and fairing 36. It is important though that whatever material is used to fabricate the spinner 34 and the fairing 36 that they are sufficiently strong to withstand rotation at the engine operating speed and that they can also withstand impact from foreign objects which are occasionally ingested by the engine during operation.

It will be appreciated that, although the nose cone assembly 30 and spinner 34 and fairing 36 making up the assembly have been described as having a conical or frusto conical shape, the outer surface can be curved. The nose cone assembly 30 may accordingly have a more dome like conical shape rather than a strict conical form.

What is claimed is:

1. A nose cone assembly for a gas turbine engine having a fan hub and comprising a spinner having a generally conical forward portion and a base portion, a flange being located on said base portion and fasteners being provided to attach said spinner via said flange to said fan hub of the gas turbine engine, said nose cone additionally including a fairing that is configured to surround and cover said base portion of said spinner when the nose cone assembly is fitted to said fan hub, said fairing, when assembled, having a generally circumferentially and axially smooth continuous outer surface, the profile of which continues that of said conical forward portion of said spinner, further fasteners being provided which extend from the fairing in a substantially radially inward direction to attach said fairing to said spinner.

2. A nose cone assembly as claimed in claim 1 in which the fairing is frusto-conical.

3. A nose cone assembly as claimed in claim 1 in which the nose cone assembly has an axially curved outer profile.

4. A nose cone assembly as claimed in claim 1 in which an upstream end of the fairing is arranged to abut and be supported from the spinner.

5. A nose cone assembly as claimed in claim 1 in which the spinner is provided with a location feature which axially engages an upstream portion of the fairing.

6. A nose cone assembly as claimed in claim 4 in which a seal is provided at the upstream end of the fairing between the upstream end of the fairing and the spinner.

7. A nose cone assembly as claimed in claim 6 in which the seal comprises an annular 'O' ring.

8. A nose cone assembly as claimed in claim 7 in which the annular 'O' ring seal is set within a recess within an abutting surface of the upstream end of the fairing.

9. A nose cone assembly as claimed in claim 6 in which the seal comprises an annular ring which has an omega cross section and which is mounted on the spinner.

10. The invention is claimed in claim 1 in which the fasteners extended from the fairing in a substantially radially inwardly directed direction to attach the fairing to the fan hub.

11. A nose cone assembly as claimed in claim 10 in which the fasteners extend in a direction generally perpendicular to an outer surface of the fairing in the region of the fasteners.

12. A nose cone assembly as claimed in claims 10 in which the fasteners are flush with the outer surface of the fairing.

13. A nose cone assembly as claimed in of claim 10 in which the fasteners comprise counter sunk screws.

14. A nose cone assembly as claimed in claim 1 in which at least three mounting brackets, disposed radially inside the fairing, attach the fairing to the spinner and fan hub.

15. A nose cone assembly as claimed in claim 14 in which the brackets are flexible in a radial direction.

16. A nose cone assembly as claimed in claim 14 in which the brackets axially locate the fairing.

17. A nose cone assembly as claimed in claim 14 in which the brackets are generally L shaped.

18. A nose cone assembly as claimed in claim 14 in which the brackets are attached using the same mounting fasteners which are used to attach the spinner to the fan hub.

19. A nose cone assembly as claimed in claim 14 in which a further flange extends from the bracket and is arranged to engage the fairing to provide axial retention of the fairing.

20. A nose cone assembly as claimed in claim 14 in which anti-rotation features are provided to prevent rotation of the brackets.

21. A nose cone assembly as claimed in claim 20 in which the anti-rotation features comprise dowels which engage the brackets.

* * * * *